(12) United States Patent
Ren et al.

(10) Patent No.: US 8,328,976 B2
(45) Date of Patent: Dec. 11, 2012

(54) METHOD OF MANUFACTURING ROOT OF MEGAWATT WIND-TURBINE BLADE

(75) Inventors: Guifang Ren, Lianyungang (CN); Guanghui Qiao, Lianyungang (CN); Huixiu Huang, Lianyungang (CN); Xiaoliang Qiao, Lianyungang (CN)

(73) Assignee: Lianyungang Zhongfu Lianzhong Composites Group Co., Ltd., Lianyungang (CN)

( * ) Notice: Subject to any disclaimer, the term of this patent is extended or adjusted under 35 U.S.C. 154(b) by 122 days.

(21) Appl. No.: 12/990,642

(22) PCT Filed: Jun. 13, 2010

(86) PCT No.: PCT/CN2010/073917
§ 371 (c)(1),
(2), (4) Date: Nov. 1, 2010

(87) PCT Pub. No.: WO2011/156947
PCT Pub. Date: Dec. 22, 2011

(65) Prior Publication Data
US 2012/0006473 A1   Jan. 12, 2012

(51) Int. Cl.
| B29C 65/00 | (2006.01) |
| B29C 70/80 | (2006.01) |
| B29C 45/00 | (2006.01) |
| B29C 47/00 | (2006.01) |
| B29C 39/02 | (2006.01) |
| B29C 43/02 | (2006.01) |
| B29C 49/00 | (2006.01) |
| B29C 49/08 | (2006.01) |
| B29C 67/00 | (2006.01) |
| B29C 35/00 | (2006.01) |
| B32B 17/00 | (2006.01) |
| B32B 37/00 | (2006.01) |
| C03C 27/00 | (2006.01) |
| B29D 22/00 | (2006.01) |
| B29B 11/06 | (2006.01) |
| B29C 51/00 | (2006.01) |
| B29C 39/14 | (2006.01) |
| B29C 55/00 | (2006.01) |
| B29C 67/20 | (2006.01) |
| B29C 43/10 | (2006.01) |
| B29C 55/28 | (2006.01) |
| B29D 24/00 | (2006.01) |
| B29D 29/00 | (2006.01) |
| B29D 7/00 | (2006.01) |
| B29B 15/00 | (2006.01) |
| A01J 21/00 | (2006.01) |
| A01J 25/12 | (2006.01) |
| A21C 3/00 | (2006.01) |
| A21C 11/00 | (2006.01) |
| A23G 1/20 | (2006.01) |
| A23G 3/02 | (2006.01) |
| A23P 1/00 | (2006.01) |
| B28B 11/08 | (2006.01) |
| B28B 21/36 | (2006.01) |

(52) U.S. Cl. ........ 156/285; 156/104; 156/286; 156/382; 264/511; 264/526; 264/553; 264/554; 264/566; 264/268; 264/571; 425/504; 425/546; 425/388; 425/405.1; 425/405.2

(58) Field of Classification Search ............... 156/104, 156/285, 286, 382; 264/511, 526, 553, 554, 264/566, 568, 571; 425/504, 546, 388, 405.1, 425/405.2
See application file for complete search history.

(56) References Cited

U.S. PATENT DOCUMENTS

| 6,620,369 | B1 * | 9/2003 | Mead ........................ 264/409 |
| 7,895,745 | B2 * | 3/2011 | Althoff et al. ............. 29/889.21 |
| 2007/0274835 | A1 * | 11/2007 | Stiesdal ..................... 416/230 |

* cited by examiner

Primary Examiner — Christopher Schatz
Assistant Examiner — Matthew Hoover

(57) ABSTRACT

A method of manufacturing root of megawatt wind-turbine blade includes the following steps: (1) manufacturing an independent female mould, and arranging a positioning stop-ring on the female mould; (2) clinging on one side of the positioning stop-ring, a plurality of glass fabrics and macroporous glass fabrics are laid on the curved surface of the female mould; (3) after laying the glass fabrics, sealing the female mould using a vacuum bag, and vacuumizing the female mould after a curved supporting board is arranged on the vacuum bag; (4) after laying a plurality of glass fabrics in the blade mould, slinging the prefabricated part and the curved supporting board to arrange them in the blade mould; (5) sealing the blade mould using another vacuum bag, vacuumizing the blade mould, thereafter infusing resin into the blade mould, after curing the root of the blade is finally formed. The method of manufacturing root of megawatt wind-turbine blade increases the production efficiency and production quality of the blade root, and prolongs the operation life of the blade root.

5 Claims, 4 Drawing Sheets

METHOD OF MANUFACTURING ROOT OF MEGAWATT WIND-TURBINE BLADE

FIELD OF THE INVENTION

The present invention relates to large wind turbine, more particularly, to a method of manufacturing root of megawatt wind-turbine blade.

BACKGROUND OF THE INVENTION

Generally, the root of the wind-turbine blade is made of more than 100 layers glass fabrics. The existing method of manufacturing of wind-turbine blade includes: firstly, manufacturing an female mould, and laying a plurality of glass fabrics on the female mould; then, arranging a vacuum bag on the female mould, and sealing the female mould; after that, vacuumizing the female mould, and compacting a plurality of above-mentioned glass fabrics to form the prefabricated part, and stopping vacuumizing after a curved supporting board is arranged on the vacuum bag; secondly, arranging a plurality of glass fabrics on the blade mould, and slinging the prefabricated part to put on the blade mould; finally, laying the vacuum bag on the blade mould, sealing the blade mould, then vacuumizing it, after closing the vacuumizing system, infusing resin into the blade mould, then the resin curing to form the blade of the wind-turbine.

Nevertheless, in the above method, on one hand, while laying a plurality of glass fabrics on the female mould in turn, each action of laying glass fabrics is all conducted by aligning the glass fabrics to each other through manual visual estimation, a larger error would be caused by visual estimation, which result in position shift of the glass fabrics when laying one glass fabric on the other one, so that the distribution of the glass fabrics of the blade root is uneven, thereby the mechanical property of the blade root has been effected, and the production quality of the blade root has been effected. On the other hand, when infusing resin, owing to the low interspace rate of the glass fabric, the resin would come across a bigger obstruction while going from the top glass fabric to the bottom glass fabric, thus infiltration difficulty would appears during the infusion process, so that the production efficiency of the blade root would be affected.

Accordingly, a need has arisen for providing an improved method of manufacturing root of megawatt wind-turbine blade to overcome the above-mentioned drawbacks.

SUMMARY OF THE INVENTION

The technical problem of the present invention to be solved is being directed against the drawbacks of the prior art, providing a method of manufacturing root of megawatt wind-turbine blade, which is characteristic of high production efficiency, high production quality, and long operation life.

The technical problem of the present invention is solved via the following technical solution, the present invention provides a method of manufacturing root of megawatt wind-turbine blade, which includes the following steps:

(1) manufacturing an independent female mould for the prefabricated part and a blade mould, one side of the female mould being working surface, the working surface including a curved surface and two flanges which are respectively extended along two upright edges of the curved surface, with the inner diameter of the curved surface being equivalent to the outside diameter of the blade root minusing the thickness of glass fabrics which are to be laminated in the blade mould previously, and arranging a positioning stop-ring whose radian is equivalent to that of the curved surface on the curved surface of the female mould;

(2) laying a plurality of glass fabrics on the curved surface of the female mould in turn, with the glass fabrics against one side of the positioning stop-ring;

while laying, coupling the adjacent glass fabrics together using spray glue, after laying every six to eight glass fabrics, applying glass adhesive tapes on both sides of the glass fabrics and two said flanges, so that two sides of the glass fabrics are fixed on two said flanges of the female mould, meanwhile, laying a macroporous glass fabrics after every ten said glass fabrics, said plurality of glass fabrics and said plurality of macroporous glass fabrics forming the prefabricated part;

(3) after laying, removing the positioning stop-ring from the female mould, and putting a vacuum bag on the working surface of the female mould, then sealing the whole female mould and vacuumizing the female mould, so as to compact said glass fabrics laid on the working surface of the female mould, and arranging a curved supporting board on the vacuum bag, thereafter stopping vacuumizing and removing the vacuum bag;

(4) laying a plurality of glass fabrics in the blade mould, then lifting the prefabricated part together with the curved supporting board arranged on the prefabricated part from the female mould, and arranging the prefabricated part together with the curved supporting board on said plurality of glass fabrics in the blade mould; and (5) removing the curved supporting board, and laying another vacuum bag on the blade mould, then sealing the whole blade mould and vacuumizing the blade mould, thereafter infusing resin into the blade mould, after curing the root of blade is finally formed.

Preferably, the specific step of coupling each pair of the adjacent glass fabrics to each other using spray glue concretely comprises: spraying the spray glue on two sides and the middle part of the glass fabrics.

Preferably, the curved supporting board in the step (3) further comprises a cross supporting rod, with two ends of the cross supporting rod respectively contacting with two opposite curved faces of the curved supporting board. Understandably, the cross supporting rod enables to support the curved supporting board in the horizontal direction, whereby the prefabricated part is fixed in the horizontal direction.

Preferably, the curved supporting board is made of glass reinforced plastic material. Due to the glass reinforced plastic material being characteristic of flexibility to a certain extent, when slinging, the diameter of the curved supporting board would be reduced by about 30 mm in the horizontal direction, so that the prefabricated part and the curved supporting board are easily put into the root of blade mould, thus the glass fabrics which is laminated in the root of the blade mould previously would not be drag down from its right position.

Preferably, said macroporous glass fabric in the step (2) is macroporous and biaxial glass fabrics. Since the biaxial glass fabrics have a simple manufacturing method, the employment of the biaxial glass fabrics would reduce the production cost.

In comparison with the prior art, firstly, the present invention provides a predetermined positioning stop-ring on the curved surface of the female mould for the prefabricated part, when laying each of glass fabrics, as long as one side of each of the glass fabrics is arranged to cling on one side of the positioning stop-ring, each of the glass fabrics could be rapidly and accurately positioned on the female mould, thus it provided a guarantee of uniform distribution of the glass fabrics laid in the blade root, and the manufacturing efficient of the prefabricated part is enhanced and the quality of the prefabricated part is enhanced, further the production efficient and the production quality of the blade root are enhanced. Secondly, when manufacturing the prefabricated part, a macroporous glass fabric is arranged on every 10 glass fabrics, while infusing resin into the blade root, the resin is facilitated to go from the top glass fabrics to the bottom glass fabrics rapidly, so as to enhance the production efficiency of the blade root.

The present invention will become apparent from the following detailed description when taken in conjunction with the accompanying drawings, which are a part of this disclosure illustrating the embodiments of the present invention.

DETAILED DESCRIPTION OF ILLUSTRATED EMBODIMENTS

Figure 1:
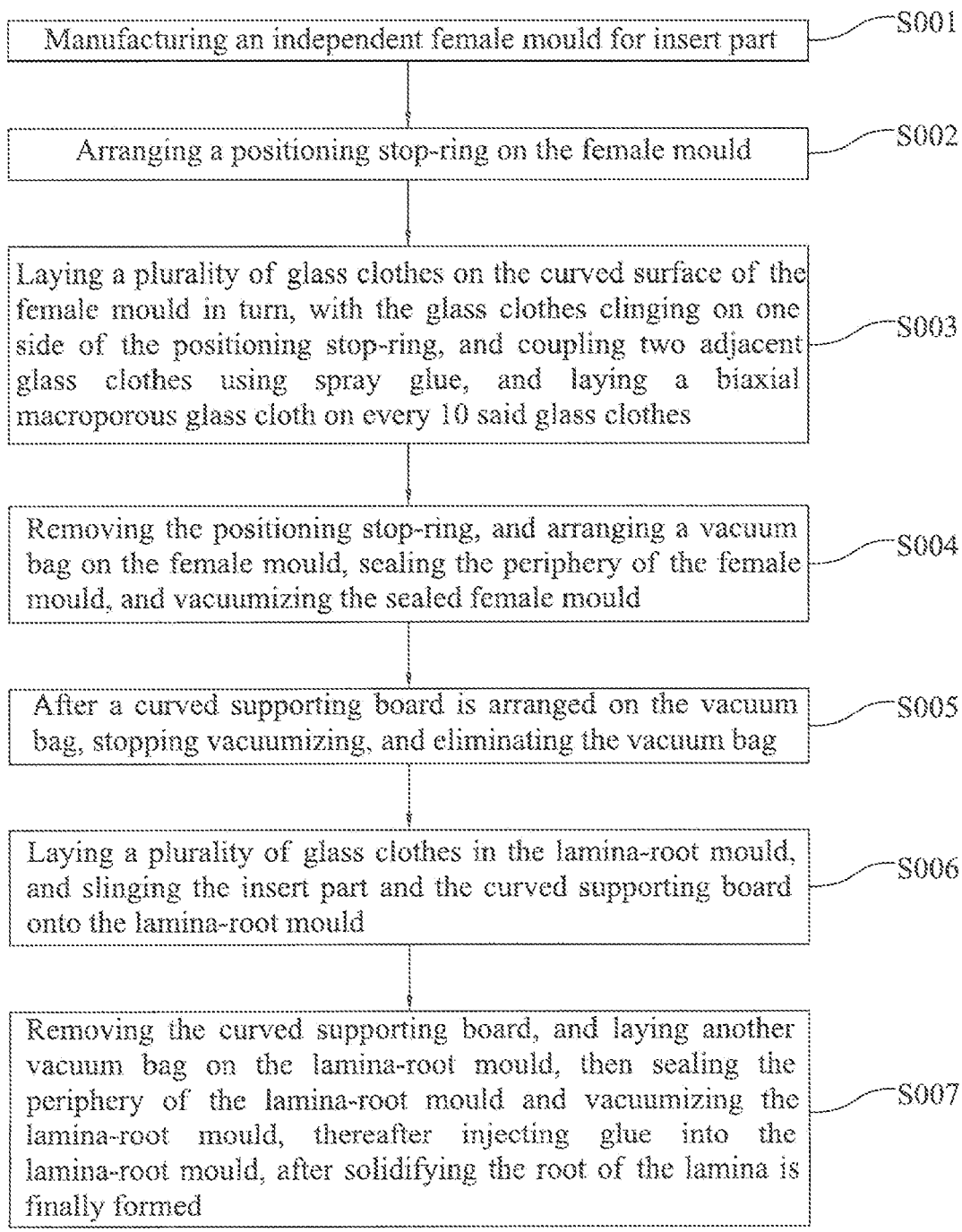
FIG. 1 is a method flow diagram demonstrating the method of manufacturing root of megawatt wind-turbine blade according to the present invention.

Various preferred embodiments of the invention will now be described with reference to the figures, wherein like reference numerals designate similar parts throughout the various views.

Figure 2:
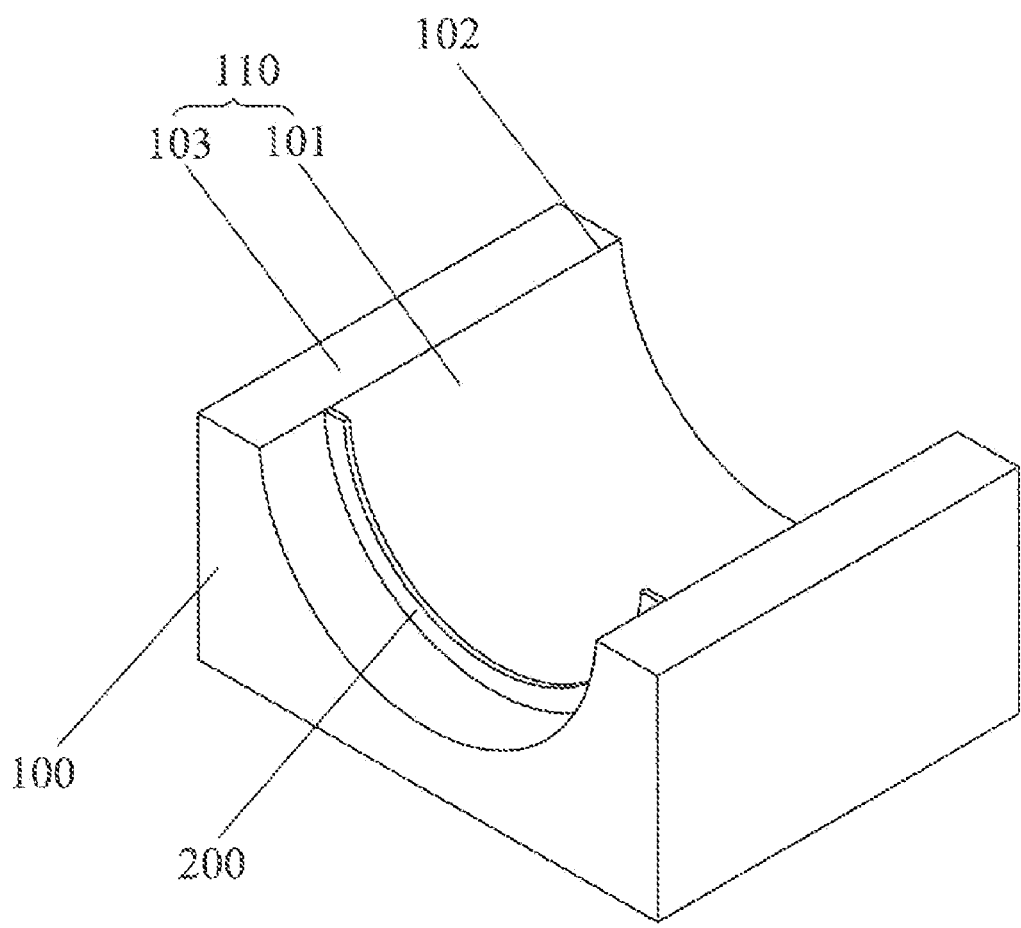
FIG. 2 is a stereogram view demonstrating the female mould according to the present invention.
Figure 3:
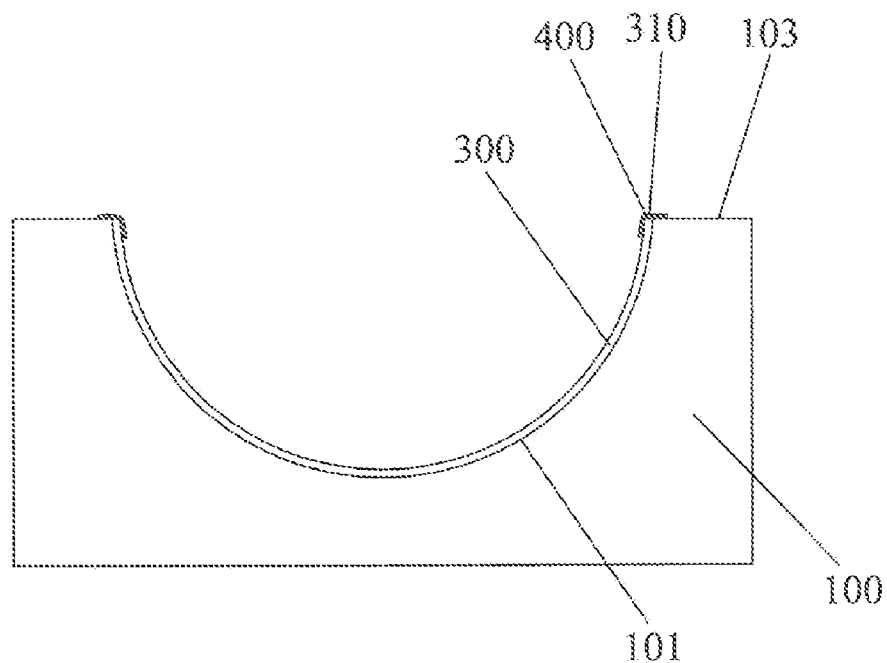
FIG. 3 is a schematic illustration demonstrating the glass adhesive tape pasted on the glass fabrics and the female mould according to the present invention.
Figure 4:
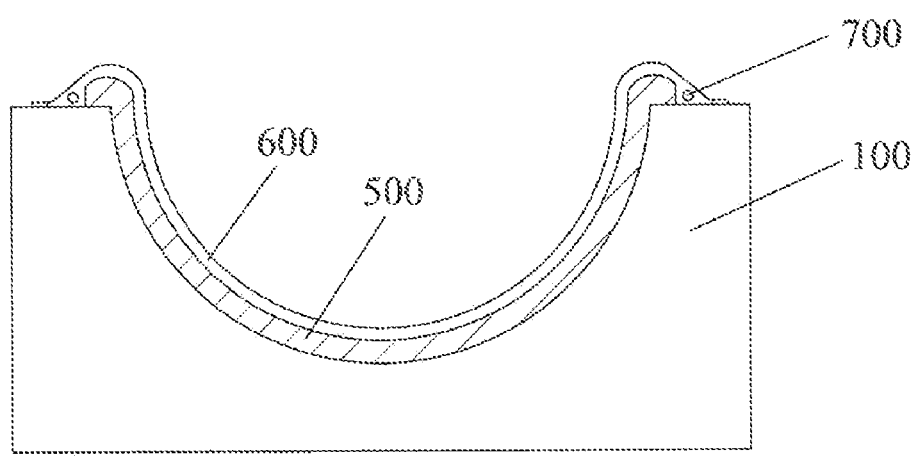
FIG. 4 is a schematic illustration demonstrating the manufacture of the prefabricated part via the female mould according to the present invention.
Figure 5:
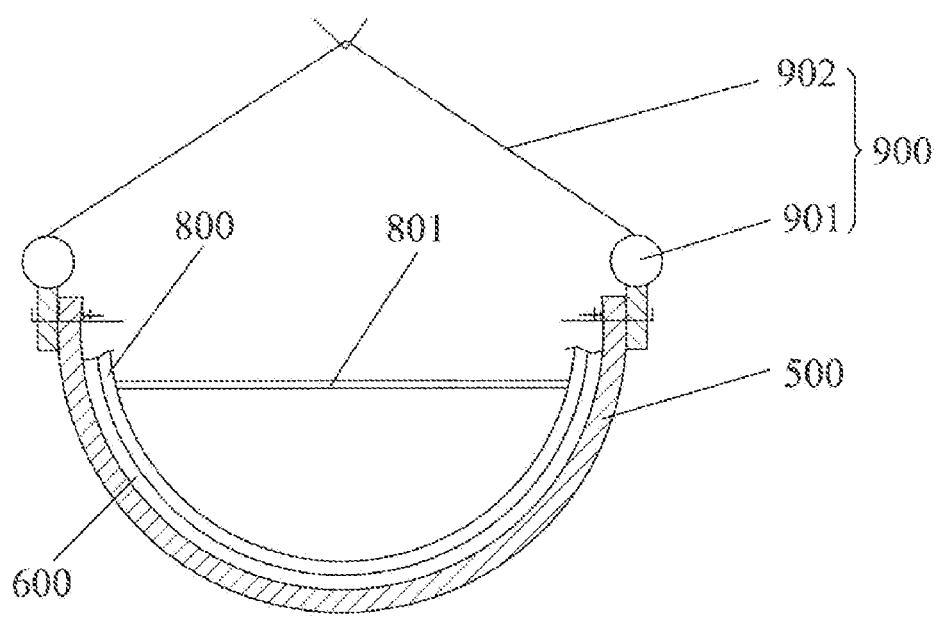
FIG. 5 is a schematic illustration demonstrating lifting the prefabricated part according to the present invention.

Referring to FIGS. 1-5, the present invention provides a method of manufacturing root of megawatt wind-turbine blade, which includes the following steps:

(S001) manufacturing an independent female mould 100, one side of the female mould 100 being working surface 110, the working surface 110 including a curved surface 101 and two flanges 103 which are respectively extended along two upright edges 102 of the curved surface 101. The inner diameter of the curved surface 101 is equivalent to the diameter of the standard outside circumcircle of blade root (not shown) subtracting the thickness of a glass fabric which is arranged on the blade mould previously (not shown);

(S002) arranging a positioning stop-ring 200 whose radian is equivalent to that of the curved surface 101 on the curved surface 101 of the female mould 100;

(S003) laying a plurality of glass fabrics 300 on the curved surface 101 of the female mould 100 in turn, with the glass fabrics 300 clinging on one side of the positioning stop-ring 200, while laying, coupling each pair of the adjacent glass fabrics 300 to each other using spray glue, and during spraying the spray glue, spraying the spray glue on two sides and the middle part of the glass fabrics 300, after laying every six to eight glass fabrics, pasting glass adhesive tapes 400 on the two sides 310 of the glass fabrics 300 and said glass adhesive tapes 400 are respectively pasted on two said flanges 103, so that two sides 310 of the glass fabrics 300 are fixed on two said flanges 103 of the female mould 100, meanwhile, laying a macroporous glass fabrics (not shown) on every 10 said glass fabrics 300, with a plurality of glass fabrics 300 and a plurality of macroporous glass fabrics forming the prefabricated parts 500;

(S004) after laying the glass fabrics, removing the positioning stop-ring 200, and arranging a vacuum bag 600 on the working surface 110 of the female mould 100, sealing the periphery of the female mould 100, then, inserting a plurality of vacuum tubes 700 between the vacuum bag 600 and the prefabricated parts 500, and vacuumizing the sealed female mould 100, so as to compact said glass fabrics 300 laid on curved surface 101 of the female mould 100;

(S005) after vacuumizing, arranging a curved supporting board 800 on the vacuum bag 600, and stopping vacuumizing;

(S006) after laying a plurality of glass fabrics (not shown) on the root of blade mould, lifting the prefabricated part 500 together with the curved supporting board 800 arranged on the prefabricated part 500 from the female mould 100, and arranging the prefabricated part 500 together with the curved supporting board 800 in the root of blade mould;

(S007) removing the curved supporting board (800), and laying another vacuum bag (not shown) on the whole blade mould, so as to seal the periphery of the whole blade mould, and vacuumizing the blade mould, thereafter infusing resin into the blade mould, after curing the root of the blade is finally formed.

Concretely, in the step (S003), the specific step of coupling each pair of the adjacent glass fabrics 300 to each other using spray glue concretely comprises: spraying the spray glue on two sides and the middle part of the glass fabrics 300.

Concretely, in the step (S006), the prefabricated part 500 is lifted by employing the slinger 900 arranged on two flanges 103 of the female mould 100. The slinger 900 includes two clamps 901, and an iron chain 902 with two ends thereof respectively fixed on two clamps 901. When the prefabricated part 500 is lifted up by the slinger 900, firstly, two sides of the prefabricated part 500 are clamped to two clamps 901. Then, the iron chain 902 of the slinger 900 is hooked by a crane (not shown), and the prefabricated part 500 which is arranged on the slinger 900 is put into the root of blade mould.

Preferably, the middle part of the curved supporting board 800 is equipped with a cross supporting rod 801, with two ends of the cross supporting rod 801 respectively contacting with two opposite curved faces 101 of the curved supporting board 800, and the cross supporting rod 801 is made of wood. Understandably, the cross supporting rod 801 enables to support the curved supporting board 800 in the horizontal direction, whereby the prefabricated part 500 is fixed in the horizontal direction.

Preferably, the curved supporting board 800 is made of glass reinforced plastic material. Due to the glass reinforced plastic material being characteristic of flexibility to a certain extent, during slinging, the diameter of the curved supporting board 800 would be reduced by about 30 mm in the horizontal direction slightly, so that the prefabricated part 500 and the curved supporting board 800 are easily put into the root of blade mould, thus the glass fabrics 300 which is arranged in the root of blade main mould would not be draged from its right position.

As mentioned above, firstly, the present invention provides a predetermined positioning stop-ring 200 on the curved surface 101 of the female mould 100, when laying each of glass fabrics 300, as long as one side of each of the glass fabrics 300 is arranged to cling on one side of the positioning stop-ring 200, each of the glass fabrics 300 could be rapidly and accurately positioned on the female mould 100, thus it provided a guarantee of uniform distribution of the glass fabrics 300 laid on the blade root, and the manufacturing efficient of the prefabricated part 500 is enhanced and the production quality of the prefabricated part 500 is enhanced, further the production efficient and the production quality of the blade root are enhanced. Secondly, when manufacturing the prefabricated part 500, a macroporous glass fabric is arranged on every 10 glass fabrics 300, while infusing resin into the blade mould, the glue is facilitated to go from the top glass fabrics to the bottom glass fabric rapidly, so as to enhance the production efficiency of the blade root.

As indicated above, the invention has been described in connection with what are considered to be the most preferred embodiments, but it is not intended to limit the scope of protection of the present invention through the above description, and modifications and variations which are made according to the essence of the present invention are intended to be included within the scope of the present invention.

What is claimed is:

1. A method of manufacturing root of megawatt wind-turbine blade, comprising:
   (1) manufacturing an independent female mould for a prefabricated part and a blade mould, one side of the independent female mould being a working surface, the working surface including a curved surface and two flanges which are respectively extended along two upright edges of the curved surface, with the inner diameter of the curved surface being equivalent to the outside diameter of a blade root minusing the thickness of glass fabrics which are to be laminated in the blade mould previously, and arranging a positioning stop-ring whose radian is equivalent to that of the curved surface on the curved surface of the independent female mould;
   (2) laying a plurality of glass fabrics on the curved surface of the independent female mould in turn, with said plurality of glass fabrics against one side of the positioning stop-ring;
   while laying, coupling the adjacent glass fabrics together using spray glue, after laying every six to eight glass fabrics, applying glass adhesive tapes on both sides of the glass fabrics and two said flanges, so that two sides of the glass fabrics are fixed on two said flanges of the independent female mould, meanwhile, laying a macroporous glass fabrics after every ten said glass fabrics, said plurality of glass fabrics and said plurality of macroporous glass fabrics forming the prefabricated part;
   (3) after laying, removing the positioning stop-ring from the independent female mould, and putting a vacuum bag on the working surface of the independent female mould, then sealing the whole independent female mould and vacuumizing the independent female mould, so as to compact said glass fabrics laid on the working surface of the independent female mould, and arranging a curved supporting board on the vacuum bag, thereafter stopping vacuumizing and removing the vacuum bag;
   (4) laying a plurality of glass fabrics in the blade mould, then lifting the prefabricated part together with the curved supporting board arranged on the prefabricated part from the independent female mould, and arranging the prefabricated part together with the curved supporting board on said plurality of glass fabrics in the blade mould; and
   (5) removing the curved supporting board, and laying another vacuum bag on the blade mould, then sealing the whole blade mould and vacuumizing the blade mould, thereafter infusing resin into the blade mould, after curing a root of blade is finally formed.

2. The method of manufacturing root of megawatt wind-turbine blade as claimed in claim 1, wherein the specific step of coupling each pair of the adjacent glass fabrics to each other using spray glue concretely comprises: spraying the spray glue on two sides and the middle part of the glass fabrics.

3. The method of manufacturing root of megawatt wind-turbine blade as claimed in claim 1, wherein the curved supporting board in the step (3) further comprises a cross supporting rod, with two ends of the cross supporting rod respectively contacting with two opposite curved faces of the curved supporting board.

4. The method of manufacturing root of megawatt wind-turbine blade as claimed in claim 1, wherein the curved supporting board is made of glass reinforced plastic material.

5. The method of manufacturing root of megawatt wind-turbine blade as claimed in claim 1, wherein said macroporous glass fabric in the step (2) is macroporous and biaxial glass fabric.

* * * * *